United States Patent [19]

Hesse, Jr. et al.

[11] Patent Number: 5,193,386
[45] Date of Patent: Mar. 16, 1993

[54] TAPERED ROLLER DYNAMOMETER

[75] Inventors: Jack E. Hesse, Jr.; Donald W. Bilsbarrow, both of Tucson, Ariz.

[73] Assignee: Hamilton Test Systems, Inc., Tucson, Ariz.

[21] Appl. No.: 804,488

[22] Filed: Dec. 9, 1991

Related U.S. Application Data

[63] Continuation of Ser. No. 586,832, Sep. 24, 1990, abandoned.

[51] Int. Cl.$^5$ ............................................. G01M 15/00
[52] U.S. Cl. ....................................................... 73/117
[58] Field of Search .......................... 73/117, 123-127, 73/146, 862.09-862.19, 862.29

[56] References Cited

U.S. PATENT DOCUMENTS

| | | | |
|---|---|---|---|
| 1,920,263 | 8/1933 | Langbein | 73/126 |
| 3,411,346 | 11/1968 | Gagliardi | 73/117 |
| 3,945,579 | 3/1976 | Schippers et al. | 242/18 DD |
| 4,047,727 | 9/1977 | Holladay et al. | 280/87.042 |
| 4,886,101 | 12/1989 | Kinnick et al. | 157/1.22 |
| 5,000,038 | 3/1991 | Katt | 73/117 |

FOREIGN PATENT DOCUMENTS

| | | | |
|---|---|---|---|
| 0966527 | 10/1982 | U.S.S.R. | 73/117 |
| 1441413 | 6/1976 | United Kingdom | 73/126 |

Primary Examiner—Robert Raevis
Attorney, Agent, or Firm—Cahill, Sutton & Thomas

[57] ABSTRACT

Apparatus for retaining contact of a wheel having a first and second sidewall includes a first roller having a tapered body, the tapered body of the first roller having a larger diameter at the first sidewall of the wheel and having a constant or curved taper to a smaller diameter towards the second sidewall of the wheel. The apparatus further includes a second roller having a tapered body, the tapered body of the second roller having a larger diameter at the first sidewall of the wheel and having a constant or curved taper to a smaller diameter towards the second sidewall of the wheel, the first and second rollers being disposed adjacent to each other, wherein the taper of the first and second rollers enables the rollers to maintain contact with the wheel at varying rotational speeds.

12 Claims, 3 Drawing Sheets

TAPERED ROLLER DYNAMOMETER

RELATED APPLICATION

This application is a continuation of Ser. No. 07/586,832, filed Sep. 24, 1990, now abandoned.

DESCRIPTION

1. Technical Field

This invention relates to dynamometers for testing of vehicles, and more particularly to such dynamometers having tapered rollers.

2. Background Art

Dynamometers are used in the testing of vehicles to simulate a vehicle in motion by allowing the driving wheels of the vehicle to rotate on two or more rollers. The rollers absorb power from the wheels through some mechanical (water brake) or electromechanical (eddy current) means. This simulation of motion allows the vehicle to be tested in place under realistic road conditions for convenient measuring of, e.g., emissions or other parameters. A dynamometer-like device is used for testing vehicle brakes by supplying force (torque) to the wheels to test the force available through the braking system.

Dynamometer rollers manufactured to date have been cylindrical in shape. However, front-wheel drive vehicles have a strong tendency to move the drive wheels off to the side of the dynamometer rollers, creating a possible hazard. As a result, the operator of a vehicle inspection program is often compelled to use an experienced inspector trained in operation of a front-wheel drive vehicle on a dynamometer. Thus, the cost of testing a front-wheel drive vehicle on a dynamometer is increased as compared to the cost of testing a rear wheel drive vehicle on the same dynamometer.

DISCLOSURE OF INVENTION

Objects of the present invention include the provision of apparatus having tapered rollers which prevent the drive wheels of a vehicle riding thereon from moving off of the rollers.

According to a first aspect of the present invention, apparatus for retaining contact of a wheel having a first and second sidewall includes a first roller having a tapered body, the tapered body of the first roller having a larger diameter at the first sidewall of the wheel and having a constant or curved taper to a smaller diameter towards the second sidewall of the wheel.

In further accord with this aspect of the present invention, the apparatus includes a second roller having a tapered body, the tapered body of the second roller having a larger diameter at the first sidewall of the wheel and having a constant or curved taper to a smaller diameter towards the second sidewall of the wheel, the first roller and the second roller being disposed adjacent to each other.

According to a second aspect of the present invention, apparatus for retaining contact of a pair of wheels disposed coaxially and having first and second sidewalls includes first and second rollers disposed coaxially, each roller having a tapered body, the tapered body of the first roller having a larger diameter at the first sidewall of a first wheel and having a constant or curved taper to a smaller diameter towards the second sidewall of the first wheel, the tapered body of the second roller having a larger diameter at a second sidewall of a second wheel and having a constant or curved taper to a smaller diameter towards the first sidewall of the second wheel.

In further accord with this aspect of the present invention, the apparatus includes third and fourth rollers disposed coaxially, each roller having a tapered body, the tapered body of the third roller having a larger diameter at the first sidewall of the first wheel and having a constant or curved taper to a smaller diameter towards the second sidewall of the first wheel, the tapered body of the fourth roller having a larger diameter at the second sidewall of the second wheel and having a constant or curved taper to a smaller diameter towards the first sidewall of the second wheel, the first roller being disposed adjacent to the third roller and the second roller being disposed adjacent to the fourth roller.

According to a third aspect of the present invention, apparatus for retaining contact of a wheel having a first and second sidewall includes first and second rollers, each roller having a tapered body, the tapered body of the first roller having a larger diameter at the first sidewall of the wheel and having a constant or curved taper to a smaller diameter towards the second sidewall of the wheel, the tapered body of the second roller having a larger diameter at the first sidewall of the wheel and having a constant or curved taper to a smaller diameter towards the second sidewall of the wheel, the first roller and the second roller being disposed adjacent to each other.

According to a fourth aspect of the present invention, apparatus for retaining contact of a pair of wheels disposed coaxially, each wheel having a first and second sidewall, includes first and second rollers, each roller having a tapered body, the tapered body of the first roller having a larger diameter at the first sidewall of a first wheel and having a constant or curved taper to a smaller diameter towards the second sidewall of the first wheel, the tapered body of the second roller having a larger diameter at the first sidewall of the first wheel and having a constant or curved taper to a smaller diameter towards the second sidewall of the first wheel, the first and second rollers being disposed adjacent to each other.

In further accord with this aspect of the present invention, the apparatus includes third and fourth rollers, each roller having a tapered body, the tapered body of the third roller having a larger diameter at a second sidewall of a second wheel and having a constant or curved taper to a smaller diameter towards the first sidewall of the second wheel, the tapered body of the fourth roller having a larger diameter at the second sidewall of the second wheel and having a constant or curved taper to a smaller diameter towards the first sidewall of the second wheel, the third and fourth rollers being disposed adjacent to each other.

By creating rollers having an inward taper (e.g., shaped as a frustum of a cone), the tendency of the vehicle wheels to move to one side of the rollers can be overcome. Thus a less experienced or inexperienced driver can perform a vehicle test on the dynamometer, resulting in a significant cost savings to the inspection program operator.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
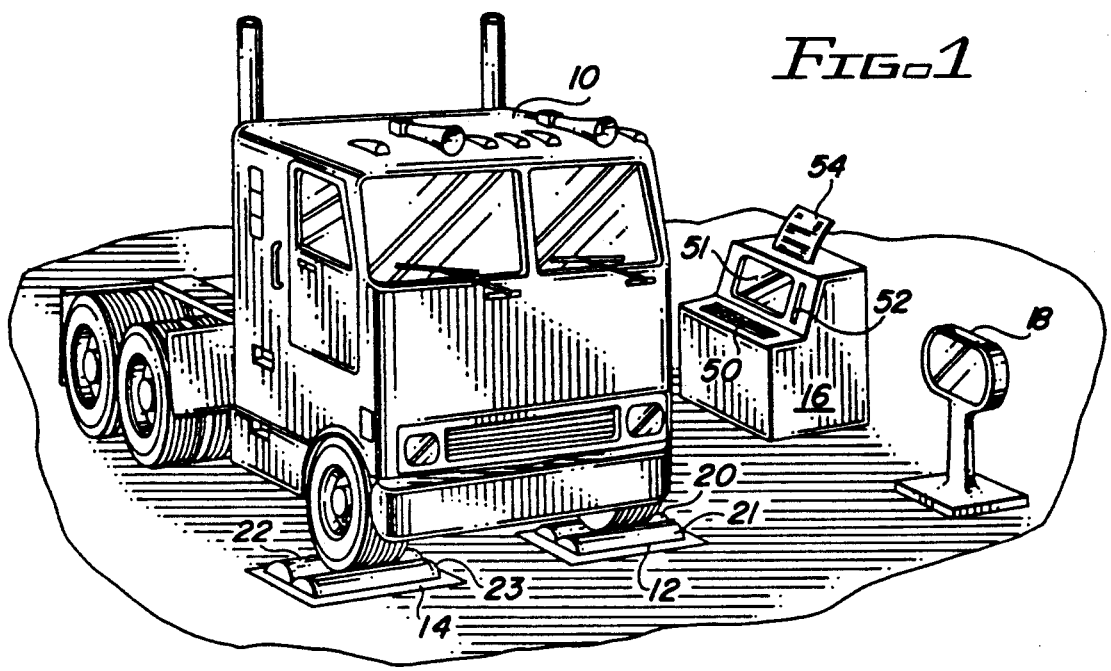
FIG. 1 is a perspective illustration of a vehicle dynamometer test station in which the tapered rollers of the present invention may be utilized.

In FIG. 1 is illustrated a typical vehicle test station in which the dynamometer tapered rollers of the present invention may be used. A tractor type truck 10 is illustrated as an exemplary test vehicle. However, it is to be understood that the present invention may be used with any class of vehicles, including automobiles, trucks or motorcycles. The test station apparatus includes left and right (as viewed from the driver's seat) test equipment assemblies 12,14, a test console 16, and an annunciator panel 18 which is used to display messages to the operator and/or driver during vehicle testing (e.g., brake testing). An exemplary brake test method is illustrated in U.S. Pat. No. 4,893,242 to Rogers et al., assigned to the assignee of the present invention, and hereby incorporated by reference.

Figure 2:
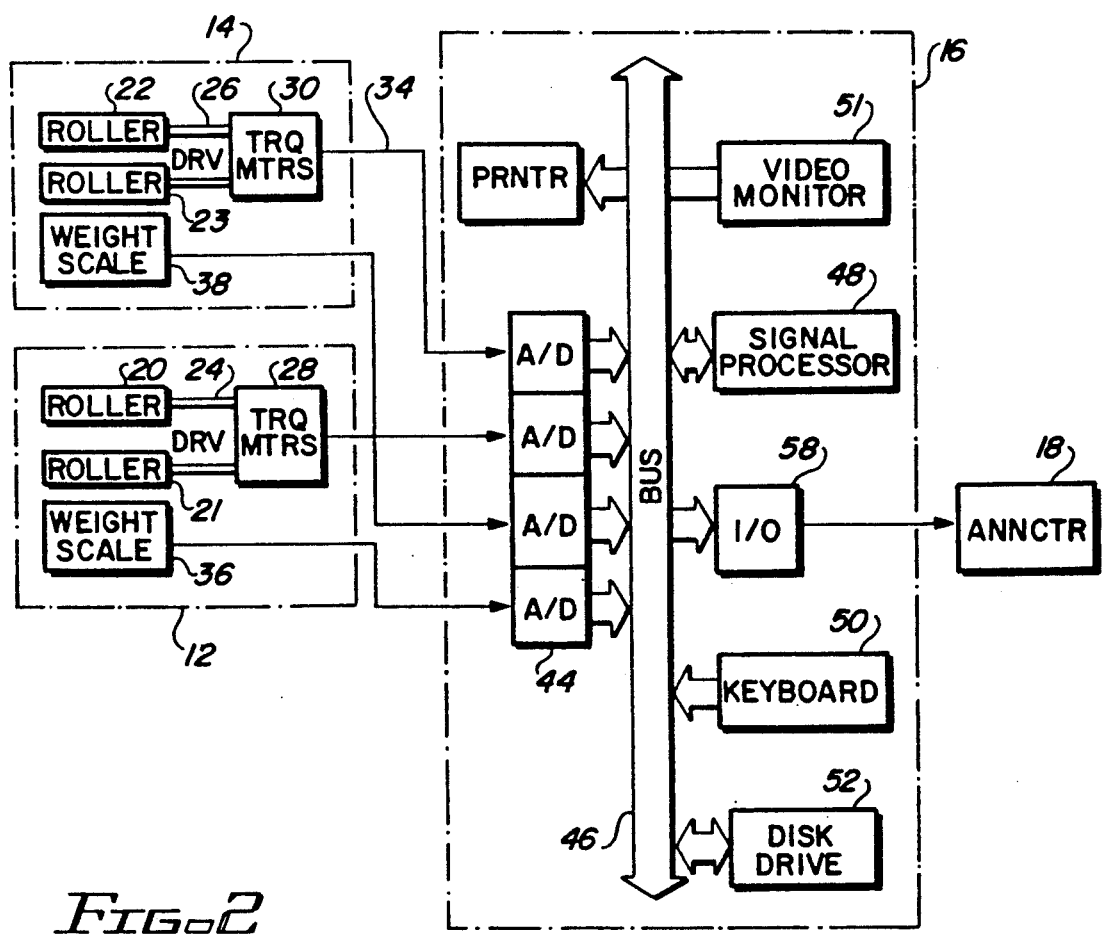
FIG. 2 is a schematic block diagram of the vehicle dynamometer test station of FIG. 1.

FIG. 2 is a schematic block diagram of the test station equipment illustrated in FIG. 1. Each assembly 12,14 includes a pair of rollers 20,21 and 22,23 respectively, which are tapered in accordance with the present invention. Each roller may be independently, rotatably mounted in the corresponding assembly 12,14. Alternatively, each pair of opposing rollers 20,22 and 21,23 may be disposed coaxially and connected together by corresponding axles (FIGS. 3-6).

Depending upon the ultimate vehicle testing application, one or both of the opposing pairs of rollers 20,22 and 21,23 may be driven through gear drive trains 24,26 by torque motors 28,30. For a brake force test in accordance with the aforementioned U.S. patent to Rogers et al., the torque motors drive the rollers at a nominally constant test speed. The signal magnitude of the motor output torque is provided from each tester on lines 32,34 to the console 16.

Each assembly 12,14 includes one or more weight scales 36,38 placed beneath the roller assembly such that the scales may respond to, and measure the applied axle weight. The scales are typically strain gauge type. With the vehicle's front wheels placed on the rollers, the scales provide the weight measurement in the form of left and right axle weights on lines 40,42 to the console 16. The weights may then be processed in accordance with the aforementioned U.S. patent to Rogers et al.

The console receives the torque and weight analog signals from the assemblies 12,14 in a multi-channel analog-to-digital (A/D) converter 44. The converter provides the digital signal equivalent of each analog signal magnitude to a console main bus 46 where it is accessed by a signal processor 48. The processor 48 may be any of a known type personal computers (PCs), with a keyboard 50, a video monitor 51, at least one disk drive 52, with suitable kilobyte (kb) of RAM and ROM storage. Also included within the console and connected to the bus 46 is a known type printer 54, along with an input/output (I/0) interface 58 connecting the console bus 16 to the annunciator 18.

Figure 3:
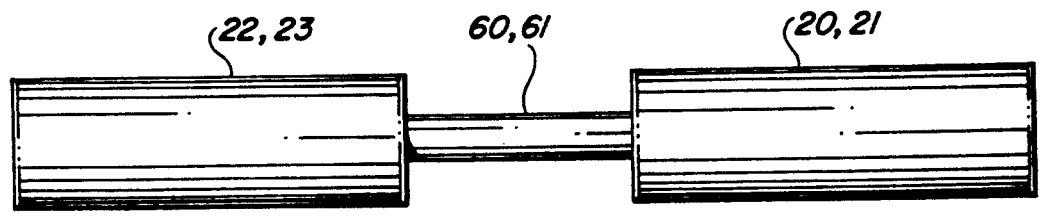
FIG. 3 is an illustration of a prior art vehicle dynamometer with cylindrical rollers.

In FIG. 3 is illustrated a prior art dynamometer in which the rollers 20,21 and 22,23 of FIG. 1 are cylindrical in nature with a rectangular cross section. Each pair of opposing rollers 20,22 and 21,23 is connected together by a corresponding axle 60,61. As described hereinbefore, it is well known that front-wheel drive vehicles have a tendency to move the drive wheels to the side of this cylindrical type of roller, creating a potential hazard.

Figure 4A:
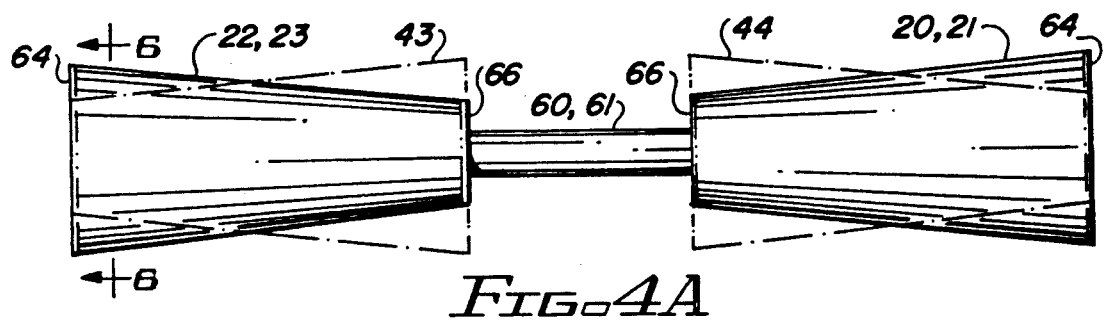
FIG. 4A is an illustration of a vehicle dynamometer having rollers with a constant taper in accordance with the present invention.

In FIG. 4A is illustrated a dynamometer in which the rollers 20,21 and 22, 23 of FIG. 1 have a constant taper in accordance with the present invention. The rollers are tapered at an angle inward towards one another so as to be shaped as a frustum of a cone. Each roller has an outer cross sectional diameter 64 which is greater in magnitude that an inner cross sectional diameter 66. Alternately, as indicated by dashed lines 43 and 44, the rollers can have a diameter which decreases with distance from the centerline of the vehicle. As described hereinafter, the tapered rollers have the ability to overcome the tendency of the vehicle wheels to move to one side of the dynamometer.

Figure 4B:
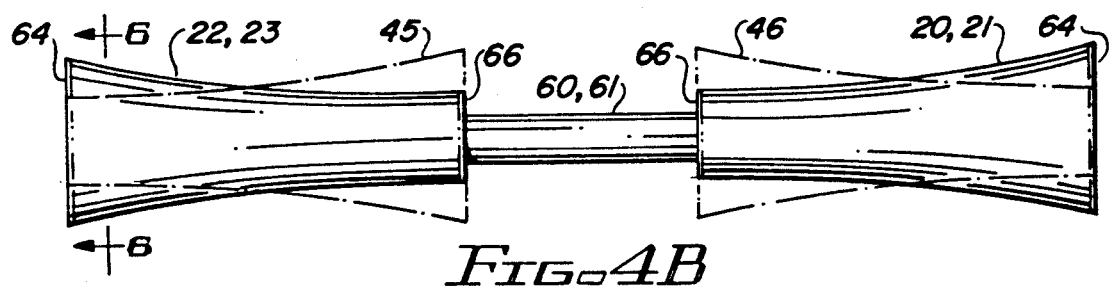
FIG. 4B is an illustration of a vehicle dynamometer having rollers with a curved taper in accordance with the present invention.

In FIG. 4B is illustrated a dynamometer in which the rollers 20,21 and 22, 23 of FIG. 1 have a curved taper in accordance with the present invention. Alternately, as indicated by dashed lines 45 and 46, the rollers can have a diameter which decreases with distance from the centerline of the vehicle. The curved taper affords the same advantages as the constant taper described hereinbefore.

Figure 5:
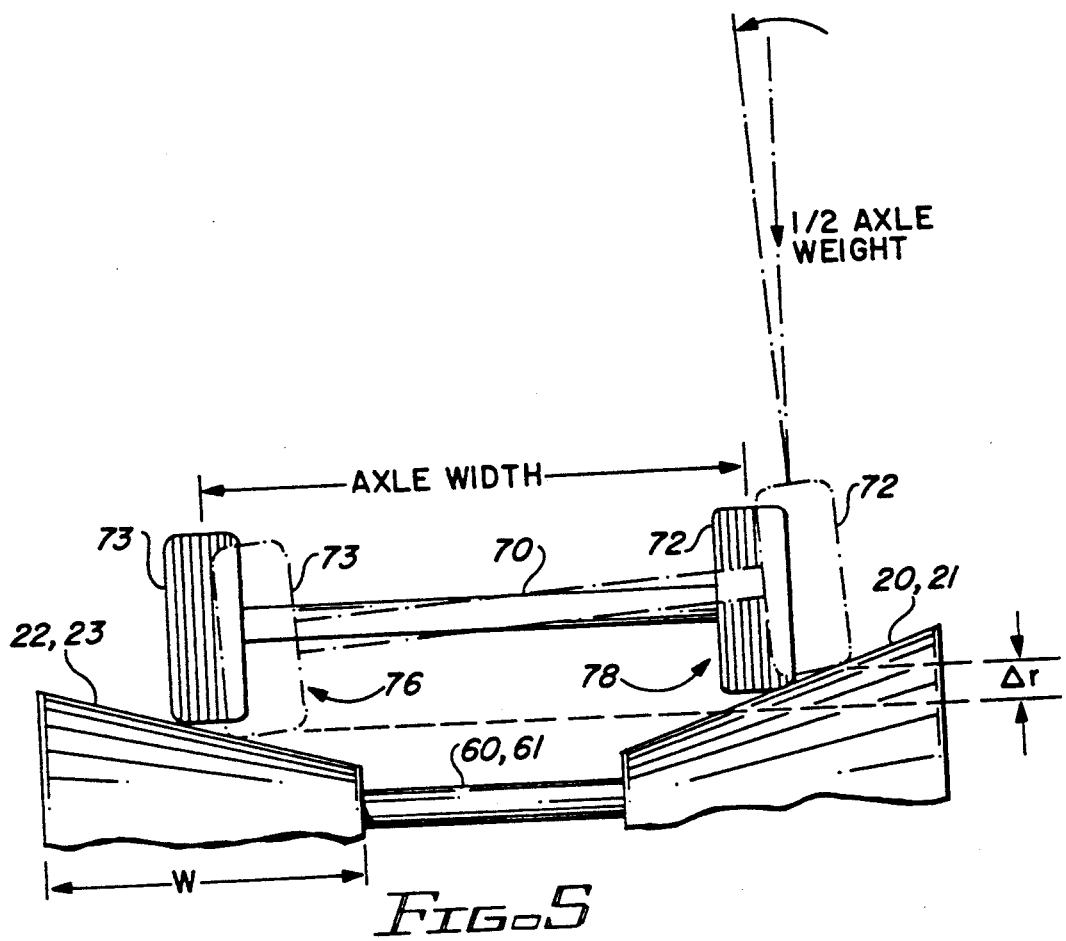
FIG. 5 is an illustration of the tapered rollers of the present invention having a set of vehicle driving wheels thereon along with a related side force analysis.

In FIG. 5 is illustrated a vehicle axle 70 connecting corresponding left and right (as viewed from the driver's seat) vehicle wheels and associated tires 72,73, each with corresponding sidewalls. The axle/tire configuration is illustrated in both a neutral position 7 relative to each roller (i.e., with no wheel rotation) and in a non-neutral position 78 relative to each roller (i e., with wheel rotation during vehicle test). For small angles or curvatures of taper, the side force available in the non-neutral position is a very small fraction of the vehicle axle weight. It is to be noted that all numbers in FIG. 5 are exemplary and taken to be representative of a vehicle/dynamometer configuration, e.g., that of FIG. 1.

The fractional side force available is negligible as compared to the force due to friction between the vehicle tire and dynamometer surface, which may approach a value equal to the vehicle axle weight (coefficient of friction of 1.0). Thus, contrary to intuition, the effect of tapering the dynamometer rollers inward does not in a practical way create a significant side force in achieving the desired stability of vehicle position on the dynamometer.

Figure 6:
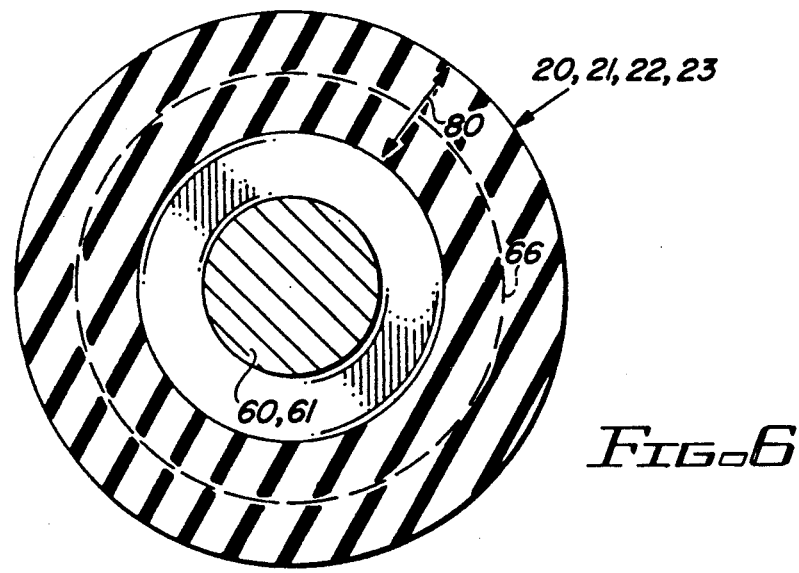
FIG. 6 is a cross sectional illustration of the tapered roller of FIGS. 4A and 4B.

For practical reasons (e.g., to minimize total weight, inertia and cost), dynamometers are not normally manufactured with solid rollers but rather with hollow core rollers with finite wall thickness 80 (FIG. 6). Therefore the degree of taper achieved with a metal cutting or machining process is limited, as contrasted to the taper achievable with a more expensive casting or molding process.

Figure 7:
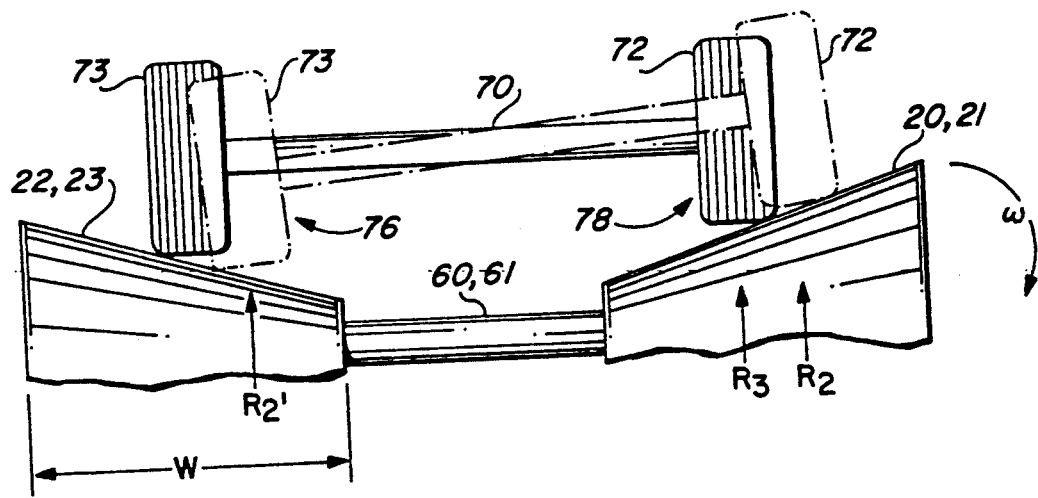
FIG. 7 is an illustration of the tapered rollers of the present invention having a set of vehicle driving wheels thereon along a related differential speed analysis.

In FIG. 7 is illustrated the principle which renders the dynamometer with tapered rollers in accordance with the present invention an effective means of preventing vehicle sideslip. Upon wheel rotation during vehicle test, the vehicle tires will reach the non-neutral position 78 on the tapered rollers. In the example of FIG. 5, the horizontal displacement ($R_3-R_2$) of the tires 72,73 from the neutral position is 6.25 inches. It follows,, that the radius $R_2$ of the roller at the left tire 73 position becomes significantly larger than the radius $R_{2'}$ of the roller at the right tire 72 position (approximately 10% larger).

Because the axle for both rollers is fixed, the angular velocity ($\omega$) is fixed and the wheel speed is proportional to the radius of the roller. Therefore the wheel on the larger roller radius $R_2$ will operate at a speed which is 10% faster than the wheel on the smaller roller radius $R_{2'}$, creating a "turn" inward to a neutral, more stable position on the dynamometer. It is this phenomenon, coupled with the angle of the tires on the slope of the dynamometer, which creates the restorative force to prevent the vehicle from being driven off the dynamometer.

The following analysis calculates an amount of linear taper for the constant tapered roller of FIG. 4A to achieve a 5% differential speed at a 6.25 inch displacement.

$$R_1 = \text{ROLLER DIAMETER}/2 \quad \text{(Equ. 1)}$$
$$= 7.944''/2$$
$$= 3.972''$$

$$R_2 = R_1 - 0.33'' \quad \text{(Equ. 2)}$$
$$= 3.972'' - 0.33''$$
$$= 3.642''$$

$$R_3 = R_1 - 0.50'' \quad \text{(Equ. 3)}$$
$$= 3.972'' - 0.50''$$
$$= 3.472''$$

$$R_2' = R_1 - 0.67'' \quad \text{(Equ. 4)}$$
$$= 3.972'' - 0.67''$$
$$= 3.302''$$

$$\text{SPEED} = (R_2 - R_2')/R_3 \quad \text{(Equ. 5)}$$
$$0.05 = (3.642'' - R_2')/3.472''$$

Rearranging Equation 5:
$$R_2' = 3.642'' - 0.05(3.472'')$$
$$= 3.468''$$

$$\text{TAPER} = (R_1 - R_2') * (35.00''/26.25'')$$
$$= (3.972'' - 3.468'') * 1.33$$
$$= 0.504''$$

The calculation indicates that for as small a taper as approximately 0.5 inches in 35 inches (a taper angle of 0.82 degrees), the difference in wheel velocities will be approximately 5%. This level of taper is easily achievable by cutting (machining) the outer wall of a hollow cylinder used in most dynamometers as manufactured. It is to be understood that the aforementioned analysis is equally applicable to the roller having a curved taper in accordance with FIG. 4B. The taper produces a significant stabilizing effect on the location of the driven wheels of the vehicle on the dynamometer.

The dynamometer with tapered rollers permits front-wheel drive vehicles (in the case of emissions tests) and all vehicles (in the case of higher speed brake tests) to be tested on rollers in a safer and more efficient manner than can be achieved with current dynamometers with cylindrical rollers. This feature in turn saves the cost and time of a specially trained driver, permitting the general public to operate their own vehicles on dynamometers, thereby reducing the overall costs of performing vehicle tests on dynamometers.

Although the invention has been illustrated and described with respect to a best mode embodiment thereof, it should be understood by those skilled in the art that the foregoing and various other changes, omissions, and additions in the form and detail thereof may be made without departing from the spirit and scope of the invention.

We claim:

1. In a vehicle diagnostic system having a control console, pairs of rollers for contact with the driven wheels of a vehicle, and electronic transducer means for interconnecting the rollers and said console, the improvement comprising:
   at least one roller in each pair having a diameter which increases with distance from the centerline of said vehicle, forming a taper along substantially the entire length of said at least one roller.

2. The apparatus of claim 1, wherein said taper is at a constant angular amount.

3. The apparatus of claim 1, wherein said taper is of a curved proportion.

4. The apparatus of claim 1, wherein at least one roller from each pair is disposed coaxially.

5. The apparatus of claim 4, wherein said rollers are connected together by an axle so that said rollers turn at the same speed, thereby causing a self-centering action when said wheels engage rollers at different diameters.

6. The apparatus of claim 1 wherein both rollers in each pair increase in diameter with increasing distance from the centerline of the vehicle.

7. In a vehicle diagnostic system having a control console, pairs of rollers for contact with the driven wheels of a vehicle, and electronic transducer means for interconnecting the rollers and said console, the improvement comprising:
   at least one roller in each pair having a diameter which decreases with distance from the centerline of said vehicle, forming a taper along substantially the entire length of said at least one roller.

8. The apparatus of claim 7, wherein said taper is at a constant angular amount.

9. The apparatus of claim 7, wherein said taper is of a curved proportion.

10. The apparatus of claim 7, wherein at least one roller from each pair is disposed coaxially.

11. The apparatus of claim 7 wherein both rollers in each pair decrease in diameter with increasing distance from the centerline of the vehicle.

12. In a vehicle diagnostic system having a control console, pairs of rollers for contact with the driven wheels of a vehicle, and electronic transducer means for interconnecting the rollers and said console, the improvement comprising:

at least one roller in each pair having a diameter which changes with distance from the centerline of said vehicle, forming a taper along substantially the entire length of said at least one roller.

* * * * *